United States Patent [19]
Hollander et al.

[11] Patent Number: 6,123,453
[45] Date of Patent: *Sep. 26, 2000

[54] METHOD AND APPARATUS FOR MEASURING TEMPERATURE

[75] Inventors: Milton B. Hollander; W. Earl McKinley, both of Stamford, Conn.

[73] Assignee: Omega Engineering, Inc., Stamford, Conn.

[*] Notice: This patent is subject to a terminal disclaimer.

[21] Appl. No.: 09/041,030

[22] Filed: Mar. 12, 1998

Related U.S. Application Data

[60] Division of application No. 08/617,265, Mar. 18, 1996, Pat. No. 5,727,880, which is a continuation-in-part of application No. 08/348,978, Nov. 28, 1994, Pat. No. 5,524,984, which is a continuation of application No. 08/121,916, Sep. 17, 1993, Pat. No. 5,368,392.

[51] Int. Cl.[7] ............................. G01K 1/00; G01J 5/02; G01B 11/00; F21V 21/30

[52] U.S. Cl. ................... 374/121; 374/141; 33/DIG. 21; 250/491.1; 362/35; 362/259

[58] Field of Search .................... 374/120, 121, 374/124, 141, 208; 33/241, DIG. 21; 362/35, 259; 356/49, 399; 250/491.1

[56] References Cited

U.S. PATENT DOCUMENTS

| | | | |
|---|---|---|---|
| 4,315,150 | 2/1982 | Darringer et al. | 374/130 |
| 4,494,881 | 1/1985 | Everest | 374/124 |
| 4,576,432 | 3/1986 | Ruger | 374/124 |
| 4,591,256 | 5/1986 | Matsumura . | |
| 4,626,686 | 12/1986 | Pompei et al. | 374/124 |
| 5,085,525 | 2/1992 | Bartosiak et al. | 374/124 |
| 5,090,789 | 2/1992 | Crabtree | 359/10 |
| 5,172,978 | 12/1992 | Nomura et al. | 374/121 |
| 5,258,871 | 11/1993 | Gupta . | |

FOREIGN PATENT DOCUMENTS

| | | |
|---|---|---|
| 3213955 | 10/1982 | Germany . |
| 3607679 | 11/1986 | Germany . |
| 62-12848 | 2/1982 | Japan ........................................ 374/121 |
| 2203537A | 10/1998 | United Kingdom . |

OTHER PUBLICATIONS

Gaylord, Thomas K., Moharam, M. G., "Analysis and Applications of Optical Diffraction by Gratings," Proceedings of the IEEE, vol. 73, No. 5, May 1985, pp. 894–937.

The Optometrics Group, catalogue Transmission Grating Beamsplitters, 1993, pp. 60–61.

McCormick, F. B., "Generation of Large Spot Arrays From a Single Laser Beam by Multiple Imaging with Binary Phase Gratings," Optical Engineering, Apr. 1989, vol. 28 No. 4, pp. 299–304.

Harvey, James E.; Scott, Marion L., "Hole Grating Beam Sampler–Versatile High–Energy Laser (HEL) Diagnostic Tool," Optical Engineering, Nov./Dec. 1981, vol. 20, No. 6, pp. 881–886.

(List continued on next page.)

Primary Examiner—Andrew H. Hirshfeld
Attorney, Agent, or Firm—William A. Drucker

[57] ABSTRACT

Method and apparatus are provided for visibly outlining the energy zone to be measured by a radiometer. The method comprises the steps of providing a laser sighting device on the radiometer adapted to emit at least one laser beam against a surface whose temperature is to be measured and positioning said laser beam about the energy zone to visibly outline said energy zone. The apparatus comprises a laser sighting device adapted to emit at least one laser beam against the surface and means to position said laser beam about the energy zone to visibly outline said energy zone. The laser beam may be rotated about the periphery of the energy zone. In another embodiment, a pair of laser beams are projected on opposite sides of the energy zone. The laser beam may be further pulsed on and off in a synchronized manner so as to cause a series of intermittent lines to outline the energy zone. Such an embodiment improves the efficiency of the laser and results in a brighter laser beam being projected.

3 Claims, 9 Drawing Sheets

OTHER PUBLICATIONS

Haidner, Helmut; Kipfer, Peter; Sheridan, John T.; Schwider, Johannes; Streibl, Norbert; Lindolf, Jürgen; Collischon, Martin; Lang, Anette; Hutfless, Joachim, "Polarizing Reflection Grating Beamsplitter for the 10.6– $\mu$m Wavelength," Optical Engineering, Aug. 1993, vol. 32, No. 8, pp. 1860–1865.

Molesini, G.; Pedrini, G.; Quercioli, F., "Laser Unequal Path Interferometer Configurations by Grating Splitting at the Fourier Plane," Optical Engineering, Sep./Oct. 1984, vol. 23, No. 5, pp. 646–649.

Mokry, Patricia A., "Unique Applications of Computer–Generated Diffractive Optical Elements," SPIE vol. 1052 Holographic Optics: Optically and Computer Generated (1989), pp. 163–171.

Munnerlyn, C. R., "A Simple Laser Interferometer," Applied Optics, Apr. 1969, vol. 8, No. 4, pp. 827–829.

Miler, Miroslav, "Photoresist as a Recording Material for Holographic Elements," SPIE vol. 2108, 8 pp. No Date.

Schmidt, J.; Völkel, R.; Stork, W.; Sheridan, J. T.; Schwider, J.; Streibl, N.; Durst, F., "Diffractive Beam Splitter for Laser Doppler Velocimetry," Optical Letters, Sep. 1, 1992, vol. 17, No. 17, pp. 1240–1242.

Kim, Richard C.; Case, Steven K., "Holographic Beamsplitter for Multiple Plane Wave Formation with Matched Phasefronts," SPIE (1989) vol. 1052, pp. 52–64.

Shuying, Wang; Chun, Lei, "New Method of Designing High–Efficiency Multi–Beam Light–Splitter," SPIE vol. 1973, pp. 87–93.

Lu, Xuenong; Wang, Ying; Wu, Minxian; Jin, Guofan, "The Fabrication of a 25×25 Multiple Beam Splitter," vol. 72, No. 3.4, pp. 157–162.

Azzam, R. M. A.; Forgala, G. W., "Creation of an Optical XYZ Coordinate System Using Bidirectional Blazing From A Symmetric Triangular–Groove Grating in a Conical Diffraction Mount," Optics Letters, vol. 18, No. 24, Dec. 15, 1993, pp. 2162–2164, USA. Abstract Only.

Hong, Baojin; He, Yongrong; Ye, Ronghua, "Laser Grating Interferometer Using Grating as Beam Splitter," Zhongguo Jiguang/Chinese Journal of Lasers, vol. A20, No. 1, 1993, pp. 34–37, China. Abstract Only.

Kawatsuki, N.; Uetsuki, M., "Crossed Grating Beam Splitter for Magnetooptical Pickup Head," Japanese Journal of Applied Physics Part 1—Regular Papers Short Notes & Review Papers, vol. 29, No. 11, Nov. 1990, pp. 2420–2423, Japan. Abstract Only.

Lehureau, J. C.; Beguin, J. Y.; Colineau, J., "Polarizing Grating Beamsplitter Using a Liquid Crystal Cell," Japanese Journal of Applied Physics, Supplement, vol. 28, Suppl. 28–3, 1989, pp. 201–203, Japan. Abstract Only.

Hansen, J. P.; Strong, J., "Performance of a Simple Spherical Lamellar Grating Beamsplitter by Wavefront Division," Aspen International Conference on Fourier Spectroscopy, Air Force Cambridge Res. Labs. 1971, pp. 215–220, Bedford, MA. Abstract Only.

Pallister, D. M.; Liu, K–L; Govil, A.; Morris, M. D.; Owen, H.; Harrison, T. R., "Raman Microprobe with Holographic Beamsplitter for Low–Frequency Operation," Applied Spectroscopy, vol. 46, No. 10, Oct. 1992, pp. 1469–1473, USA. Abstract Only.

Courjon, D; Bulabois, J., "Noncoherent Microholography Using a Holographic Optical Element As A Beamsplitter," Optical Engineering, vol. 20, No. 2, Mar.–Apr. 1981, pp. 233–235, USA. Abstract Only.

Spornik, N. M.; Tuev, A. F., "Universal Interferometer with the Reference Wave Formed From the Object Wave," Optiko–Mekhanicheskaya Promyshlennost, vol. 59, No. 9, Sep. 1992, pp. 53–56, Russia. Abstract Only.

Mikes, T., "Fringe Benefits: Applications of Holographic Elements," Photronics Spectra, vol. 17, No. 3, Mar. 1983, pp. 40–44, USA. Abstract Only.

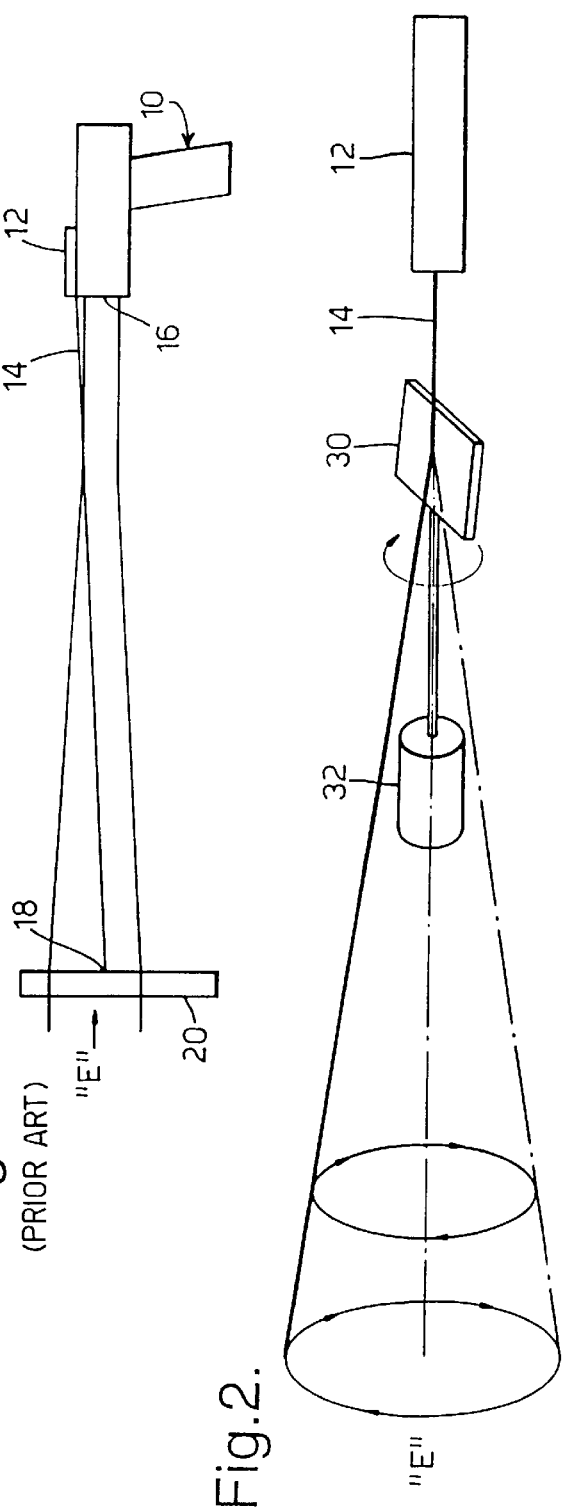
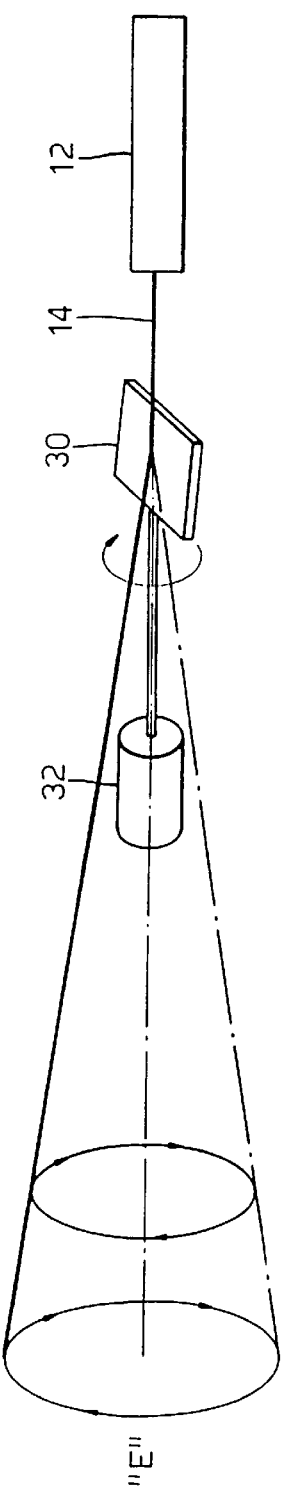
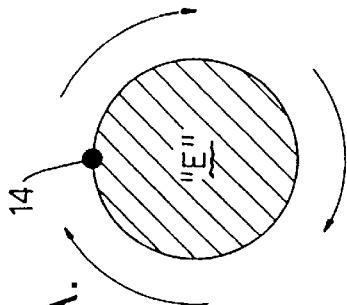
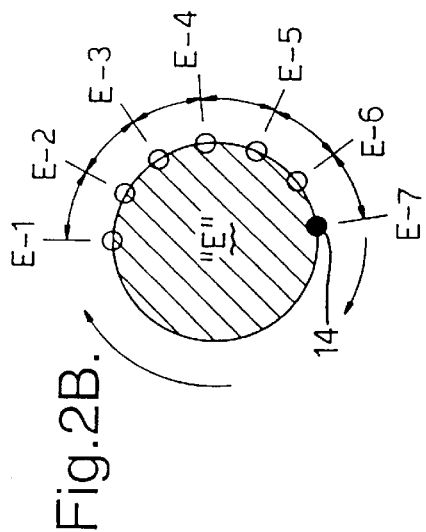
Fig. 1. (PRIOR ART)
Fig. 2.
Fig. 2A.
Fig. 2B.

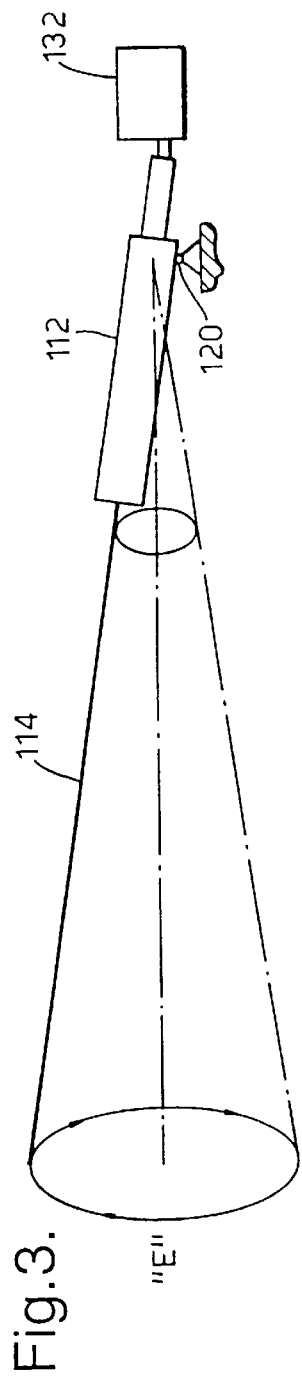
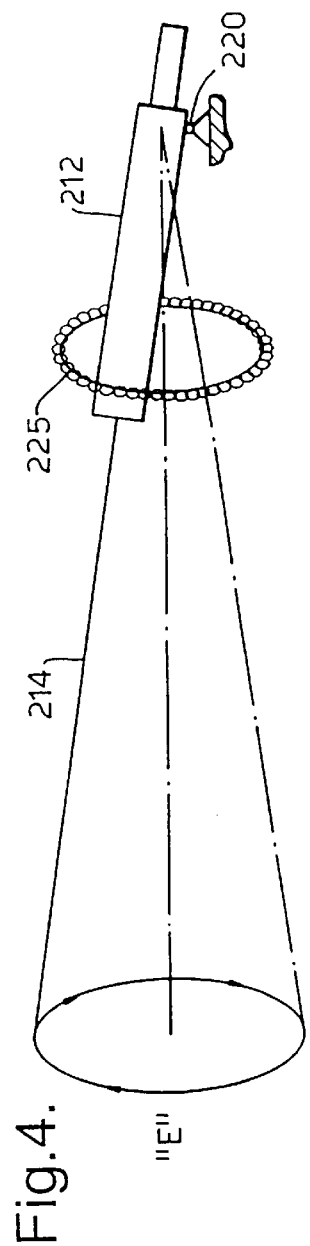
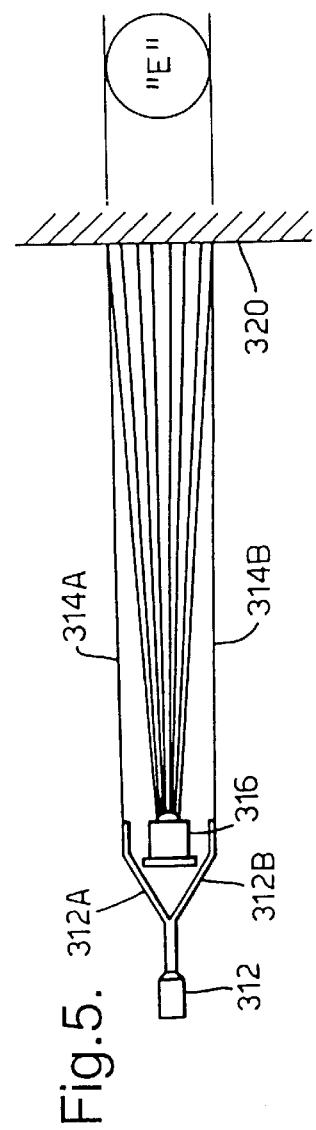

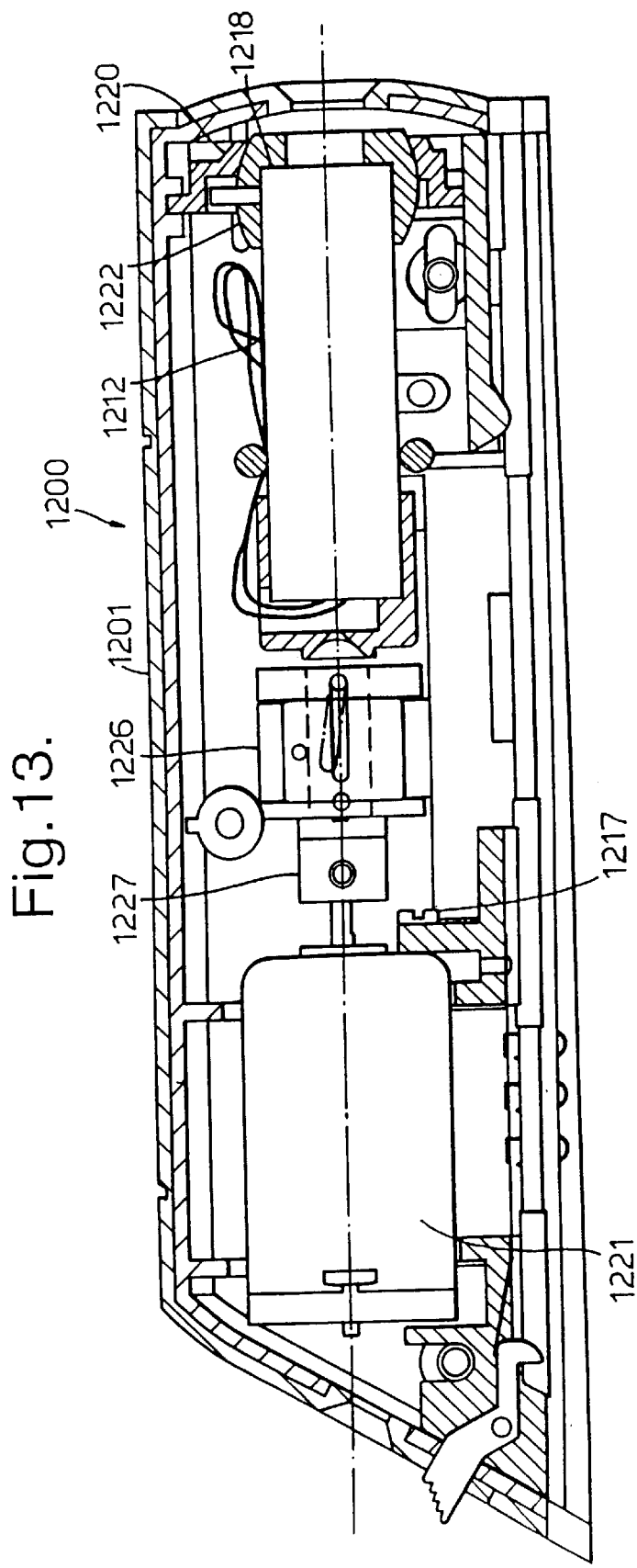

METHOD AND APPARATUS FOR MEASURING TEMPERATURE

This is a division of application Ser. No. 08/617,265 now U.S. Pat. No. 5,727,880 filed Mar. 18, 1996, which is a CIP of Ser. No. 08/348,978 filed Nov. 28, 1994 now U.S. Pat. No. 5,524,984 wich in turn was a continuation of Ser. No. 08/121,916 filed Sep. 17, 1993 now U.S. Pat. No. 5,368,392.

BACKGROUND OF THE INVENTION

1. Field of the Invention

The present invention relates generally to a method and apparatus for more accurately measuring the temperature of a surface using infrared measurement techniques and, more particularly, to such a method and apparatus which utilizes a laser sighting device which is adapted to project a circumscribing laser sighting beam or beams for more clearly defining the periphery of the energy zone from which the temperature is measured. Generally speaking, this accomplished by rotating the laser beam about the periphery of the energy zone; by the use of two or more stationary laser beams which are focused on the periphery of the energy zone; or by the use of a controlled single laser beam directed towards two or more predetermined locations on the periphery of the energy zone. In an alternative embodiment, a single laser beam may be rotated around the periphery of the energy zone using, for example, slip rings. In another embodiment, the single rotating laser may be pulsed on and off in a synchronized manner in order to produce a series of intermittent lines outlining the energy zone, thus increasing the efficiency of the laser by concentrating its total wattage in a smaller area, causing a brighter beam.

2. Description of the Prior Art

Remote infrared temperature measuring devices (commonly referred to as infrared pyrometers or radiometers) have been used for many years to measure the temperature of a surface from a remote location. Their principle of operation is well known. All surfaces at a temperature above absolute zero emit heat in the form of radiated energy. This radiated energy is created by molecular motion which produces electromagnetic waves. Thus, some of the energy in the material is radiated in straight lines away from the surface of the material. Many infrared radiometers use optical reflection and/or refraction principles to capture the radiated energy from a given surface. The infrared radiation is focused upon a detector, analyzed and, using well known techniques, the surface energy is collected, processed and the temperature is calculated and displayed on an appropriate display.

Examples of such infrared radiometers are illustrated at pages J-1 through J-42 of the *Omega Engineering Handbook,* Volume 2B. See, also, U.S. Pat. No. 4,417,822 which issued to Alexander Stein et al. on Nov. 29, 1983 for a Laser Radiometer; U.S. Pat. No. 4,527,896 which issued to Keikhosrow Irani et al. on Jul. 9, 1985 for an Infrared Transducer-Transmitter for Non-Contact Temperature Measurement; and U.S. Pat. No. 5,169,235 which issued to Hitoshi Tominaga et al. for Radiation Type Thermometer on Dec. 8, 1992. Also see Baker, Ryder and Baker, Volume II, *Temperature Measurement in Engineering,* Omega Press, 1975, Chapters 4 and 5.

When using such radiometers to measure surface temperature, the instrument is aimed at a target or "spot" within the energy zone on the surface on which the measurement is to be taken. The radiometer receives the emitted radiation through the optical system and is focused upon an infrared sensitive detector which generates a signal which is internally processed and converted into a temperature reading which is displayed.

The precise location of the energy zone on the surface as well as its size are extremely important to insure accuracy and reliability of the resultant measurement. It will be readily appreciated that the field of view of the optical systems of such radiometers is such that the diameter of the energy zone increases directly with the distance to the target. The typical energy zone of such radiometers is defined as where 90% of the energy focused upon the detector is found. Heretofore, there have been no means of accurately determining the size of the actual energy zone unless it is approximated by the use of a "distance to target table" or by actual physical measurement Target size and distance are critical to the accuracy of most infrared thermometers. Every infrared instrument has a field of view (FOV), an angle of vision in which it will average all the temperatures which it sees. Field of view is described either by its angle or by a distance to size ratio (D:S). If the D:S=20:1, and if the distance to the object divided by the diameter of the object is exactly 20, then the object exactly fills the instruments's field of view. A D:S ratio of 60:1 equals a field of view of 1 degree.

Since most IR thermometers have fixed-focus optics, the minimum measurement spot occurs at the specified focal distance. Typically, if an instrument has fixed-focus optics with a 120:1 D:S ratio and a focal length of 60" the minimum spot (resolution) the instrument can achieve is 60 divided by 120, or 0.5" at a distance of 60" from the instrument. This is significant when the size of the object is close to the minimum spot the instrument can measure.

Most general-purpose IR thermometers use of focal distance of between 20" and 60" (50 and 150 cm); special close-focus instruments use a 0.5" to 12" focal distance. See page Z54 and Z55, Volume 28, *The Omega Engineering Handbook,* Vol. 28.

In order to render such devices more accurate, laser beam sighting devices have been used to target the precise center of the energy zone. See, for example, Pages C1-10 through C1-12 of *The Omega Temperature Handbook,* Vol. 27. Various sighting devices such as scopes with cross hairs have also been used to more accurately identify the center of the energy zone to be measured. See, for example, Pages C1-10 through C1-21 of *The Omega Temperature Handbook,* Vol. 27.

The use of a laser to pinpoint the center of the energy zone does not, however, provide the user with an accurate definition of the actual energy zone from which the measurement is being taken. This inability frequently results in inaccurate readings. For example, in cases where the area from which radiation limits is smaller than the target diameter limitation (too far from or too small a target), inaccurate readings will occur.

One method used to determine the distance to the target is to employ an infrared distance detector or a Doppler effect distance detector or a split image detector similar to that used in photography. However, the exact size of the energy zone must still be known if one is to have any degree of certainty as to the actual area of the surface being measured. This is particularly true if the energy zone is too small or the surface on which the energy zone encompasses is irregular in shape. In the case where the surface does not fill the entire energy zone area, the readings will be low and, thus, in error.

Similarly, if the surface is irregularly shaped, the readings will also be in error since part of the object would be missing from the actual energy zone being measured. Thus, the use of a single laser beam to the apparent center of the energy zone does not insure complete accuracy since the user of the radiometer does not know specifically the boundaries of the energy zone being measured.

As will be appreciated, none of the prior art recognizes this inherent problem let alone offers a solution to the problems created thereby.

SUMMARY OF THE INVENTION

Against the foregoing background, it is a primary object of the present invention to provide a method and apparatus for measuring the temperature of a surface using infrared techniques.

It is another object of the present invention to provide such a method and apparatus which provides more accurate measurement of the surface temperature than by the use of techniques heretofore employed.

It is yet another object of the present invention to provide such a method and apparatus which permits the user to visually identify the energy zone on the surface to be measured.

It is still yet another object of the present invention to provide such method and apparatus which employs a laser beam or beams for clearly outlining the periphery of the energy zone on the surface.

To the accomplishments of the foregoing objects and advantages, the present invention, in brief summary, comprises a method and apparatus for visibly outlining the energy zone to be measured by a radiometer. The method comprises the steps of providing a laser sighting device on the radiometer adapted to emit at least one laser beam against a surface whose temperature is to be measured and controlling said laser beam about the energy zone to visibly outline said energy zone. The beam would be controlled in such a fashion where it is directed to predetermined points of the target zone. This can be done mechanically or electrically.

Another embodiment of this invention employs a plurality of laser beams to describe the outline of the energy zone either by splitting the laser beam into a number of points through the use of optical fibers or beam splitters or the use of a plurality of lasers. One embodiment of the apparatus comprises a laser sighting device adapted to emit at least one laser beam against the surface and means to rotate said laser beam about the energy zone to visibly outline said energy zone. This rotation can be by steps or continuous motion.

Another embodiment consists of two or more stationary beams directed to define the energy zone. The two or more laser beams could be derived from a dedicated laser to each beam or by means of beam splitters. This can be accomplished by mirrors, optics and fiber optics.

Another embodiment consists of a laser beam splitting device that emits one laser beam which is split into a plurality of beams that outline the energy zone.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIG. 1 is a schematic illustration of the prior art type of radiometers using laser sighting devices;

FIG. 2 is a schematic illustration of a preferred embodiment of the present invention in which the laser beam is circumscribing the target zone using a mirror;

FIGS. 2A and 2B illustrate the manner in which the laser beam is relocated in stepped fashion to identify the energy zone;

FIG. 3 is a schematic illustration of an alternative embodiment of the present invention in which the laser is pivoted about a pivot point by the use of mechanical motive means;

FIG. 4 is a schematic illustration of another alternative embodiment of the present invention in which the laser is directed through a magnetic field to identify the target zone;

FIG. 5 is a schematic illustration of another alternative embodiment of the present invention in which a number of individual laser beams are projected so as define the energy zone being measured;

FIG. 13 is a side view illustrating still another modified version of the laser sighting device of the present invention;

BRIEF DESCRIPTION OF THE PREFERRED EMBODIMENTS

Figure 6:
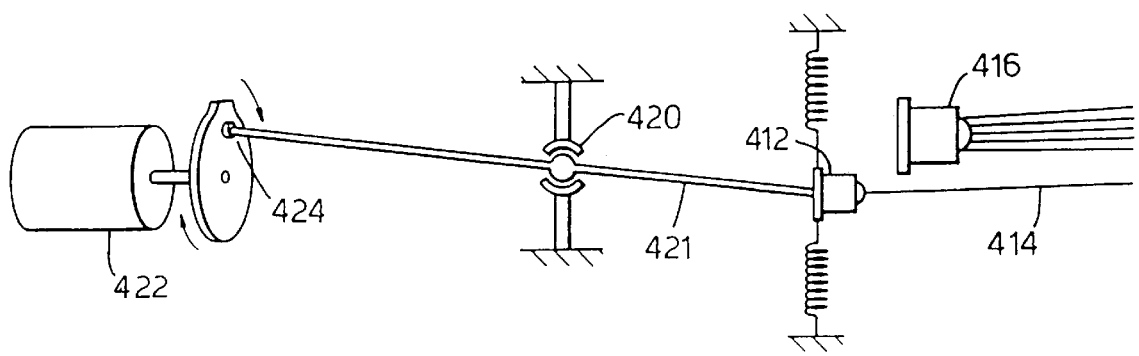
FIG. 6 is a schematic illustration of another alternative embodiment of the present invention in which the laser is mechanically pivoted.

Traditional, prior art radiometers have long employed laser sighting devices to assist in the proper aim and alignment of the instrument. FIG. 1 illustrates the operation of traditional, prior art, hand held radiometers. Such a radiometer, referred to generally by reference numeral 10, include a laser site scope 12 which emits a laser beam 14 to a spot or target 18 on the surface 20 whose temperature is to be measured. This spot 18 is located in the center of the energy zone "E" which is to be measured by the radiometer 10. This spot 18 includes a detector 16 which is connected to conventional internal circuitry and display means (not shown) for conversion, calculation and display of the temperature of the surface 20 calculated indirectly from the energy radiated from the surface within the energy zone E. Such energy is radiated in straight lines in all directions away from the surface 20 and captured with the detector 16 on the radiometer 10. Using infrared radiation principles, the radiometer is thus able to capture and measure the infrared energy in the energy zone E and determine the surface temperature thereof.

The actual size and shape of the energy zone E is determined by the optics of the radiometer and the distance between the radiometer and the target. Each radiometer has a defined angle of vision or "field of view" which is typically identified in the instrument's specification sheet. The size of the energy zone E is predetermined when the field of view is known in conjunction with the distance to the target. Obviously, the further the radiometer is held to the target (i.e., the greater the distance), the larger the energy zone E.

This can be expressed in a "distance to spot size ratio." For example, with a "distance to spot size ratio of 40:1 the periphery of the energy zone would have a 1" diameter at a distance of 40" or, at a distance of 20" the diameter of the energy zone would be ½". The manufacturer of the pyrometer usually provides field of view diagrams for determining the energy zone at specific distances.

As can readily be appreciated, however, such laser aiming devices are merely able to identify the center of the energy zone being measured and not the outer periphery of the actual energy zone from which the measurement is being taken. The farther away from the surface the radiometer 10 is positioned, the larger the energy zone E. Thus, depending upon the size and configuration of the surface 20, the actual energy zone E may, conceivably, include irregular shaped portions of the surface 20 or even extend beyond the edges of the surface. Of course, in such instances, the resultant measured temperature would be inaccurate. Without knowing the outer perimeter of such energy zone E, the user of the radiometer 10 would have no knowledge of such fact or that the resultant readings could be inaccurate.

The present invention provides a means for visibly defining the energy zone E so that the user of the radiometer 10 can observe the actual energy zone being measured to determine where it falls relative to the surface being measured. In the various embodiments of this invention, a fine laser line or lines is projected against the surface being measured and such line or lines is positioned so as to encompass the periphery of the energy zone E. If a rotating laser beam is employed, positioning can be effected, alternatively, by moving either the laser itself or the laser beam emitted from the laser. If the perimeter of the energy zone E could be identified on the object by the movement of the laser beam in a path about the circumference of the energy zone E, the user would be able to quickly and accurately determine if the energy zone from which the measurement was being taken was fully on the surface to be measured and whether its surface was of a type which would provide an otherwise accurate measurement.

The periphery of the energy zone E is identified as a function of the stated "field of view" of the particular radiometer as identified in its specifications and the distance between the radiometer and the target. Identification of the size and shape of the energy zone is easily done using conventional mathematical formulas. Once identified, the laser beam is then projected about the periphery of the energy zone E in accordance with the methods and apparatus hereinafter described. One simple "aiming" approach is to project the laser beam at the same angle as the field of view of the radiometer emulating from the same axis or, alternatively, by mechanically adjusting the laser beam angle in accordance with the "distance to spot size ratio" calculations. In either event, the periphery of the energy zone E would be identified by the laser beam.

FIG. 2 illustrates a first embodiment of the present invention in which the laser aiming device 12 emits a laser beam 14 which is aimed at a mirrored surface 30 which is positioned in front of the laser beam 14. The mirror 30 is rotated using motive means 32 so as to rotate the beam in a circular fashion to define the energy zone E on the surface being measured. Alternatively, the mirror 30 can be rotated by vibratory means or by the application of a magnetic field (not shown). Rotation of the mirror 30 should be at a refraction angle which corresponds to the 90% energy zone E thereby permitting the laser beam 14 to rotate about the periphery of the energy zone E thereby making it visible to the user of the radiometer 10.

It should be appreciated that the laser aiming device 12 may be an integral part of the radiometer 10 or, alternatively, a separate unit that may be mounted on the radiometer 10.

Alternatively, a prism can be used in place of the mirror 30 with predetermined angles to cause the prism to function as the reflecting mirror surface and, thereby, direct the laser beam about the perimeter of the energy zone.

FIGS. 2A and 2B illustrate the manner in which the laser beams can be used to outline the energy zone E on the surface to be measured. It is important that rotation of the beam 14 be carefully controlled so that rotation is at such a speed which can be visually followed. This will permit full beam intensity. As illustrated in FIGS. 2A and 2B, the laser beam is rotated about the energy zone E through a series of steps with the laser beam being permitted to remain in each step for at least one hundredth of a second before moving to its next position. This is accomplished by creating a plurality of steps E-1, E-2 etc., around the energy zone E. The laser beam 114 would stop at each step for the predetermined period of time to permit the beam to be visually observed before moving to the next step.

FIG. 3 illustrates another embodiment of the present invention in which the laser 112 itself is rotated or displaced so as to scribe a circle which defines the energy zone E by mechanically pivoting the laser 112 about pivot point 120 using motive means 132. Alternatively, the laser 112 can be rotated by vibratory means (not shown) or by the application of a magnetic field (not shown). Rotation of the laser 112 should, however, be at a refraction angle which corresponds to the 90% energy zone E thereby permitting the laser beam 114 to rotate about the periphery of the energy zone E to make it visible to the user of the radiometer 10.

In FIG. 4, the laser 212 is rotated about a pivot point 220 by the application of a magnetic field 225 so as cause the emission of the laser beam 214 around the periphery of the 90% energy zone E to make the beam visible to the user of the radiometer 10. In such embodiment, means (not shown) are provided for modifying the magnetic field 225 to correspond to the 90% energy zone so as to permit the laser to be rotated accordingly.

In FIG. 5, the laser 312 has at least two components 312A and 312B which produce at least two individual laser beams 314A and 314B about the detector 316. These at least two individual beams 314A and 314B are directed to the surface 320 being measured at the perimeter of the energy zone E rather than at its center. Through the use of a number of such laser beams, the energy zone E becomes clearly identified rather than merely the center of the energy zone E. If desired, individual lasers can be used or laser splitting devices can be used to split a single laser beam.

FIG. 6 illustrates yet another embodiment of the present invention in which the laser 412 is mechanically pivoted in a circular fashion around the detector 416 so as to emit a laser beam 414 in a circular path on the surface (not shown) thereby defining the energy zone E. Laser 412 is pivotally mounted on pivot bearing 420 provided on connecting arm 421. Arm 421 is mounted on pivot bearing 424 which is rotated by motor 422. In such a manner, the laser beam 414 emitted from the laser 412 rotates about and outlines the energy zone E on the surface from which the temperature is being measured.

Figure 7:
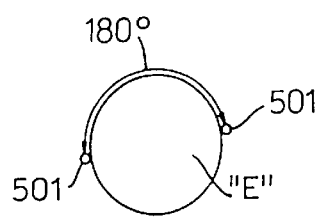
FIG. 7 schematically illustrates the positioning of fiber optics to create a pattern of the target zone with the laser beam.

The rotation of the laser beam may also be effected using fiber optics techniques as shown in FIG. 7 in which the laser beam is projected through fiber optics means 501. In such manner, the beam fans out from the laser source and encircles and thereby defines the energy zone E. By the use of a sufficient number of fiber objects, one can outline the circumference of the target area E with a light ring. This can be accomplished by as few as two fibers 501 positioned 180 degrees apart since the pick up pattern would be circular.

Figure 8:
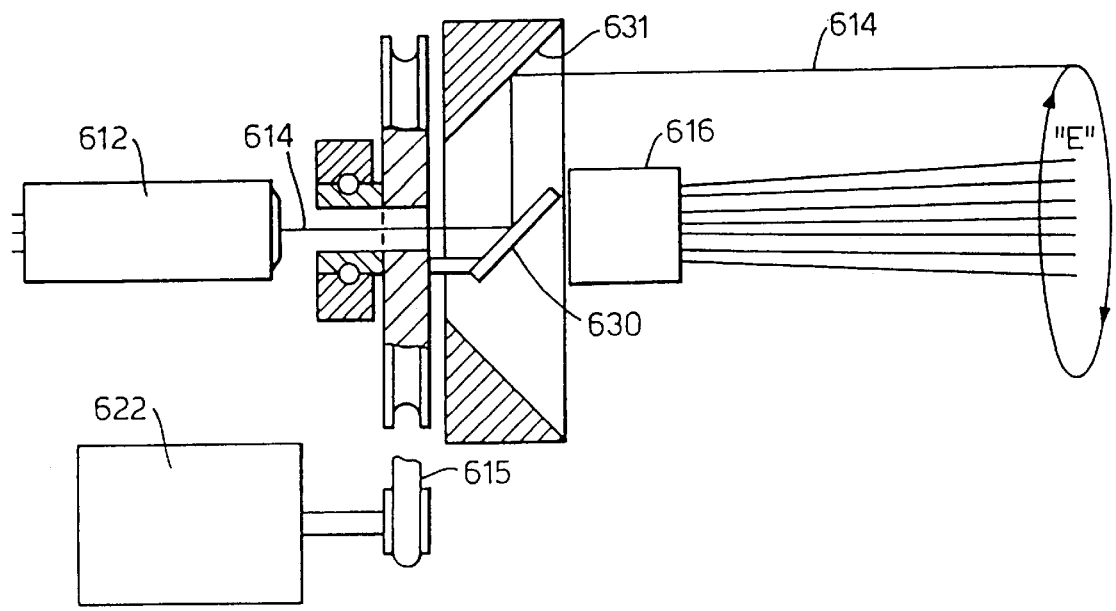
FIG. 8 is a detailed sectional view of the another alternative embodiment of the present invention in which the laser is mechanically pivoted about the detector.

FIG. 8 illustrates still another means of effecting rotation of the laser beam 614 emitted from laser 612. In this manner, the laser beam 614 is directed against a rotating flat surface mirror 630 where it is reflected against a plated plastic cone mirror 631. The reflected beam is then projected to the surface and defines the perimeter of the energy zone E. The flat mirror 630 is driven by motor 622. In such manner, the laser beam 614 rotates about the circumference of the energy zone E on the surface being measured. The mirrors are positioned at such an angle that the laser projection is at the same angle as the infrared detector pickup angle.

Figure 9A:
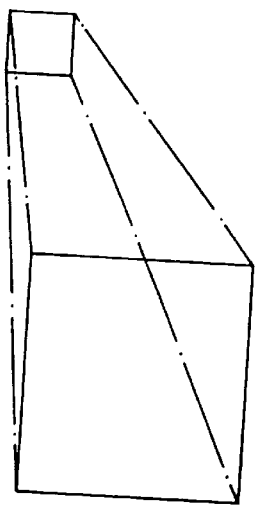
FIGS. 9A–C illustrate alternative configurations of the targets which can be projected using the apparatus of the present invention.
Figure 9C:
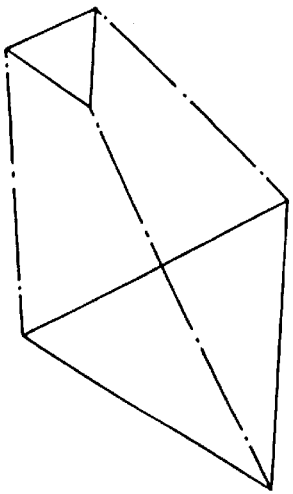
Figure 9B:
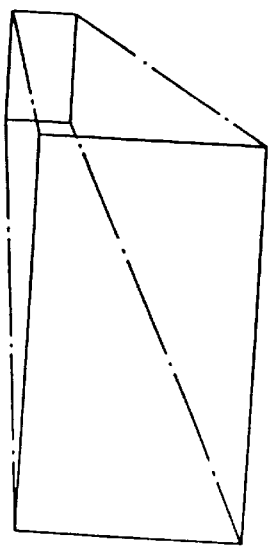

It will, of course, be appreciated that the energy zones E may assume configurations other than the circular configuration shown in FIGS. 1–8. FIGS. 9A–C illustrate alternative square (FIG. 9A), rectangular (FIG. 9B) and triangular (FIG. 9C) configurations for the light patterns which may be accomplished using the means of the present inventions.

Figure 10:
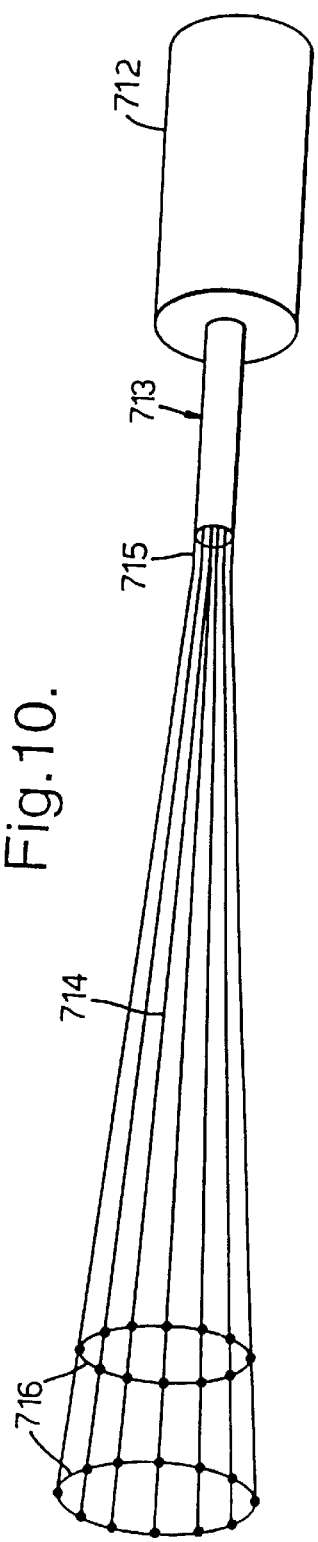
FIG. 10 is a schematic illustration of another embodiment of the invention wherein the laser is divided into a plurality of laser beams defining the energy zone by the use of optical fibers.

FIG. 10 illustrates a method for defining the energy zone where a circular configuration can be accomplished without rotation of the laser beam wherein a plurality of fixed optical fibers positioned to project a number of spots is employed. In this figures, a fixed laser 712 projects a beam 713 which is split into a plurality of beams 714 by a bundle of optical fibers 715 in order to project a pattern 716 onto the surface defining the energy zone E. Additional configurations may also be used, if desired.

Figure 11:
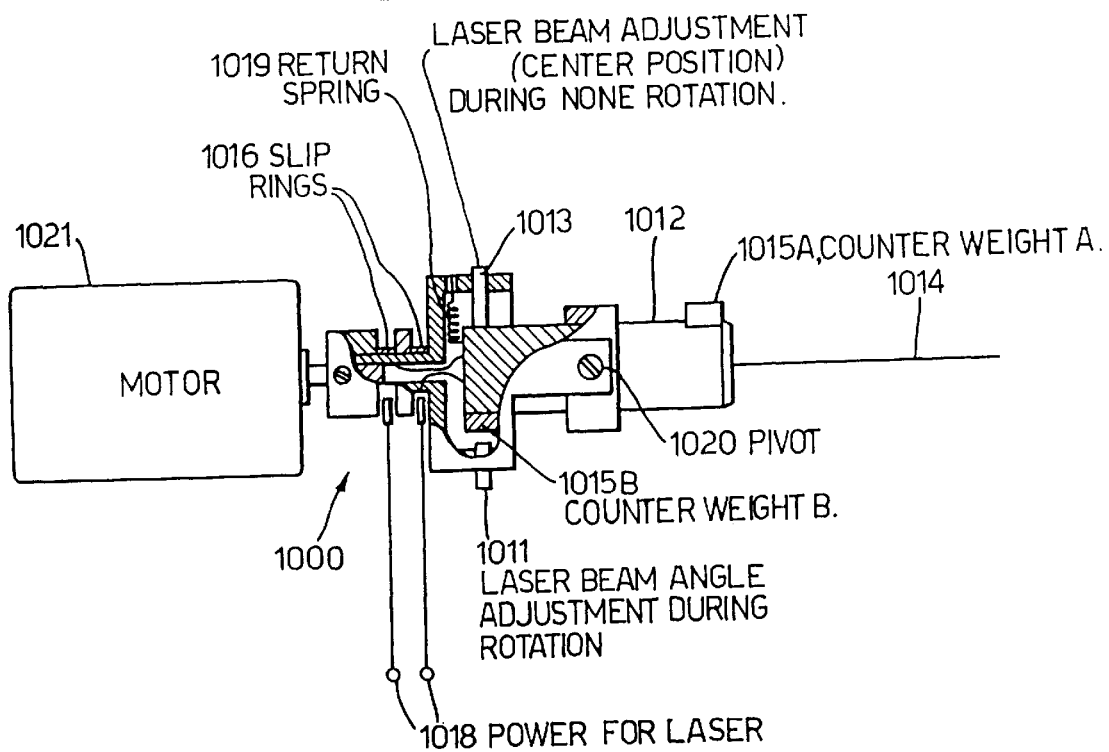
FIG. 11 is a cross sectional side view of a laser sighting device which may be used in conjunction with a radiometer in which the laser is rotated using slip rings.
Figure 12:
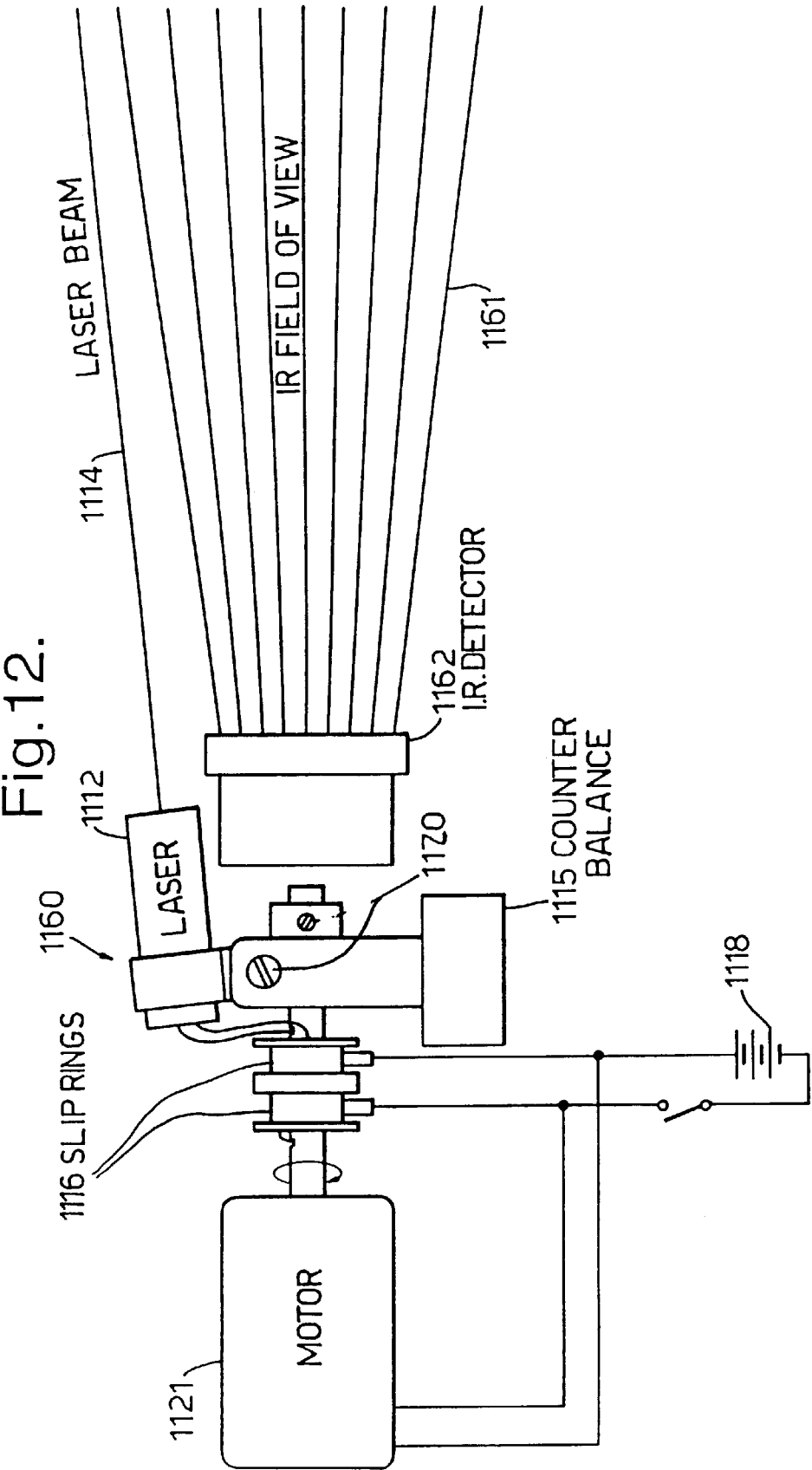
FIG. 12 is a side view illustrating a modified version of the laser sighting device of FIG. 11 with the sighting device mounted on an IR detector.

FIGS. 11–12 illustrate further embodiments of the present invention in which the laser is adapted to be rotated by the use of slip rings and counter weights. For example, FIG. 11 illustrates one such laser sighting device 1000. Laser sighting device 1000 can be provided as an integral unit in combination with an IR detector (not shown) or, alternatively, may be self contained as a removable sighting device which can be attached to and removed from IR detectors.

The laser sighting device 1000 of FIG. 11 includes a laser 1012 powered by power source 1018 and which projects a laser beam 1014 against a target. The laser 1012 is pivotally mounted about pivot 1020. Motor 1021 is provided for powering the sighting device and causing the laser 1012 to rotate. An external switch (not shown) may be provided to turn the motor 1021 on and off and, as such, the rotation of the laser 1012. Upper and lower screw adjustments 1013 and 1017, respectively, are provided for controlling the position of the laser 1012 and, more importantly, the direction of the laser beam 1014. Upper screw adjustment 1013 is adapted to be used during non-rotation while lower screw adjustment 1017 is used during rotation of the laser 1012.

The laser 1012 is powered with power source 1018. Slip rings 1016 are provided to facilitate rotation of the laser 1012. Upper and lower counterweights 1015A and 1015B, respectively, are provided above and below the laser 1012 and a return spring 1019 is also provided.

The laser 1012 of sighting device 1000 in FIG. 11 is adapted to rotate about the pivot 1020 when driven by the motor 1021. Thus, the laser 1012 is able to project a laser beam 1014 in a circle-type pattern against a target (now shown). During rotation, the centrifugal force will act upon the counterweights 1015A and 1015B causing the laser 1012 to tilt. The angle at which it tilts can be controlled by the screw adjustments 1013 and 1017. The angle is adjusted to correspond to the IR detector field of IR detector in which the sighting device is used. The laser beam 1014 will then follow the periphery of the target zone of the IR detector (not shown). Once the motor 1021 is turned off, the return spring 1019 will cause the laser 1012 to center. In this manner, the laser beam will now be in the center of the target zone. This serves as a calibration for the user and insures that the laser sighting device is properly aimed.

A slightly modified version of the laser sighting device of FIG. 11 is illustrated in FIG. 12. Laser sighting device 1100 is shown in combination with an IR detector 1160 which has an IR field of view 1161. Laser sighting device 1100 includes a laser 1112 which projects a laser beam 1114. Laser 1112 is pivotally mounted on pivot 1120. A counterbalance 1115 is provided on the side of the laser 1112 opposite the pivot 1115. The laser 1112 is powered by power source 1118 and adapted to be rotated by motor 1121. Slip rings 1116 are provided for facilitating the rotation of the laser 1112.

The laser sighting device 1100 of FIG. 12 is adapted to operate in the same way as sighting device 1000 of FIG. 11. As the laser 1112 is rotated about the pivot point 1120, the laser beam 1114 is caused to be projected against the target (not shown) about the periphery of the IR field of view 1161 of the IR detector 1160.

FIG. 13 illustrates yet another embodiment of the laser sighting device of the present invention. Laser sighting device 1200 is provided as a stand-alone unit which may be mounted on and removed from standard IR detectors or radiometers. The sighting device 1200 includes a laser 1212 contained within the housing 1201 of the sighting device 1200. Laser 1212 is adapted to project a laser beam 1214 against a target (now shown). The laser 1212 is powered by a power source (not shown). A motor 1221 is connected to the laser 1212 by rotational assembly 1227 thereby causing it to rotate within the housing 1201. A slider 1226 is further provided to facilitate rotation of the laser 1212 within the housing.

Adjustment screw 1217 is further provided for controlling the position of the motor 1221 and, as such, the direction of the laser beam 1214. A swivel ball 1222 is provided about the outward end of the laser 1212 which is seated in swivel ball seat 1220. Spring washer 1218 is further provided adjacent the swivel ball 1222.

The laser sighting device 1200 operates in substantially the same manner as the sighting devices depicted in FIGS. 11–12 in that the single laser 1212 is rotated by motor 1221 to cause the projecting laser beam 1214 to circle around the periphery of an IR field.

Figure 15:
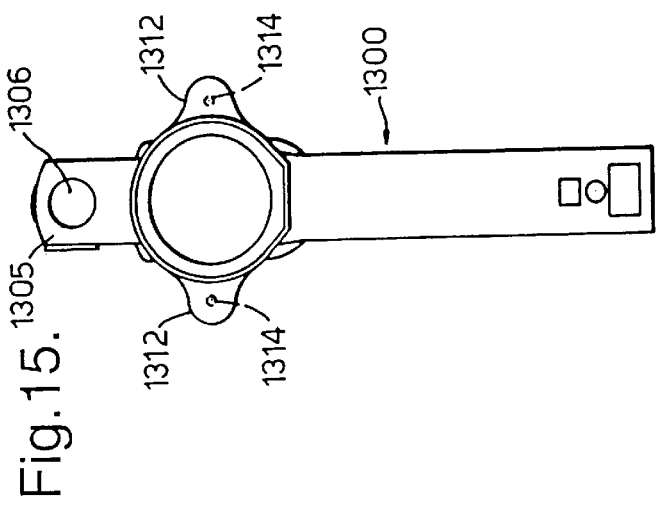
FIG. 15 is a front view of the embodiment of FIG. 14.
Figure 14:
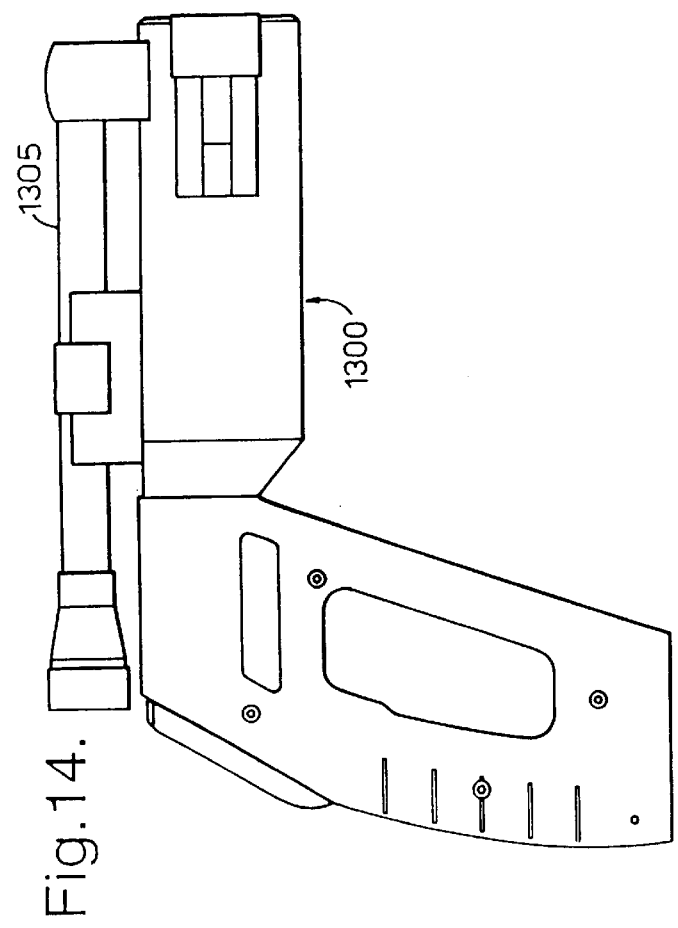
FIG. 14 is a side view of yet another embodiment of the invention in which the laser sighting device utilizes twin laser beams provided on opposite sides of an IR detector.
Figure 16:
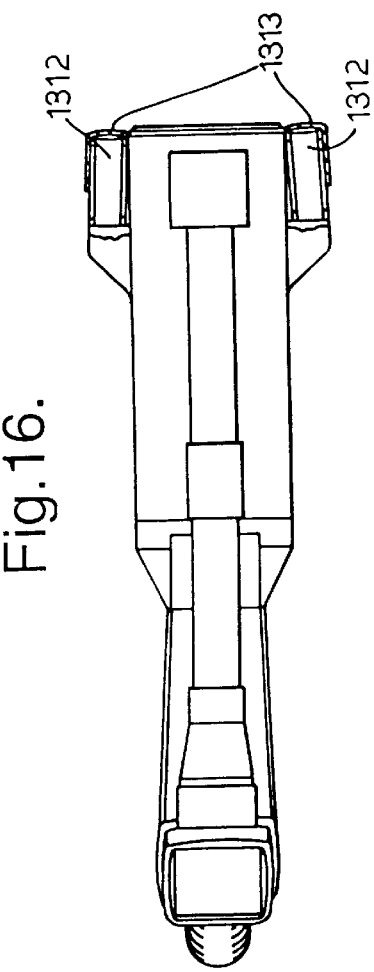
FIG. 16 is a top view of the embodiment of FIGS. 14–15.

FIGS. 14–16 illustrate yet another version of the laser sighting device of the present invention shown in combination with a radiometer. In the embodiment of FIGS. 14–16, a conventional radiometer 1300 is provided. Radiometer includes a telescope aiming sight 1305 with a lens 1306 mounted on the top thereof. Telescope aiming sight 1305 permits the user to visually aim the radiometer 1300 against a target.

A pair of laser sighting devices 1312 are provided on opposite sides of the radiometer 1300. Laser sighting devices 1312 include a laser 1314 provided within the laser sighting devices 1312 which are adapted to project a laser beam (not shown) toward a target on either side of the energy zone to be measured by the radiometer. In this manner, the laser beams are used to define the outer periphery of the energy zone being measured by the radiometer 1300.

Figure 17:
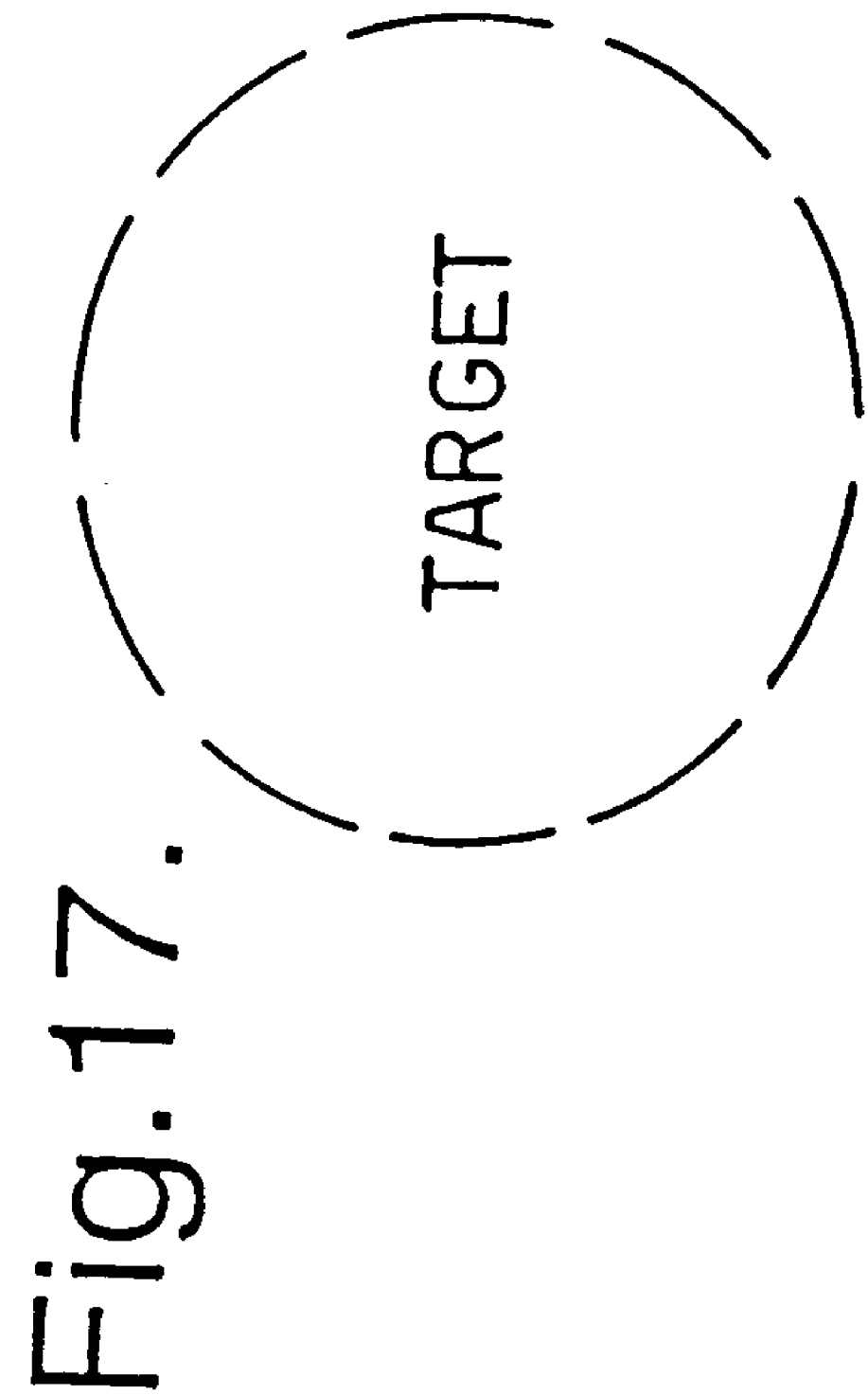
FIG. 17 illustrates the intermittent lines formed by a laser which is pulsed on and off in a synchronized manner.

In an alternate embodiment, the lasers depicted in FIGS. 11–16 may be pulsed on and off in a synchronized manner. FIG. 17 depicts the series of intermittent lines that serve to outline the energy zone in such an embodiment. The intermittent use of the laser in this embodiment results in an increase in the efficiency of the laser, which, in turn, allows for an increased concentration of the laser's total wattage in a smaller area, causing a brighter beam.

Having thus described the invention with particular reference to the preferred forms thereof, it will be obvious that various changes and modifications can be made therein without departing from the spirit and scope of the present invention as defined by the appended claims.

Wherefore, we claim:

1. In a method in which a laser sight is used to identify and to define an energy zone to be measured by a radiometer when measuring the temperature of a surface having said zone, the improvement comprising operating said sight by:

projecting at least one laser beam from said sight toward said surface; driving said sight by a motor; and causing said at least one beam to travel about the periphery of the zone on said surface to identify and to define said zone.

2. In a method in which a laser sight is used to identify and to define an energy zone to be measured by a radiometer when measuring the temperature of a surface having said zone, the improvement comprising operating said sight by:

projecting at least one laser beam from said sight toward said surface, and causing said at least one laser beam to travel about the periphery of said zone on said surface to identify and to define said zone; and projecting said at least one laser beam from said sight toward said surface to identify the center of said zone.

3. In a method in which a laser sight is used to identify and to define an energy zone to be measured by a radiometer when measuring the temperature of a surface having said zone, the improvement comprising operating said sight by protecting at least one laser beam toward said surface, adjusting the position of said beam; and also causing said beam to travel about the periphery of said zone on said surface to identify and to define said zone.

* * * * *